(12) United States Patent
Unseld et al.

(10) Patent No.: US 8,336,889 B2
(45) Date of Patent: Dec. 25, 2012

(54) METALLIC FLAT GASKET

(75) Inventors: Guenther Unseld, Neenstetten (DE); Georg Egloff, Weissenhorn (DE); Kurt Hoehe, Langenau (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 247 days.

(21) Appl. No.: 12/450,974

(22) PCT Filed: Apr. 24, 2008

(86) PCT No.: PCT/EP2008/003330
§ 371 (c)(1),
(2), (4) Date: Mar. 8, 2010

(87) PCT Pub. No.: WO2008/128788
PCT Pub. Date: Oct. 30, 2008

(65) Prior Publication Data
US 2010/0164185 A1    Jul. 1, 2010

(30) Foreign Application Priority Data
Apr. 24, 2007    (EP) .................................... 07008321

(51) Int. Cl.
*F02F 11/00* (2006.01)
(52) U.S. Cl. ........................................ 277/594; 277/593
(58) Field of Classification Search .................. 277/592, 277/593, 594, 595
See application file for complete search history.

(56) References Cited

U.S. PATENT DOCUMENTS

| | | | |
|---|---|---|---|
| 1,782,087 A | 5/1926 | Bailey | |
| 7,131,649 B2* | 11/2006 | Sueda | 277/594 |
| 7,213,813 B2* | 5/2007 | Sueda | 277/594 |
| 7,527,269 B2 | 5/2009 | Tiefenbach et al. | |
| 2004/0217552 A1* | 11/2004 | Sueda | 277/592 |
| 2005/0206091 A1 | 9/2005 | Detmann et al. | |
| 2006/0061045 A1* | 3/2006 | Burg | 277/593 |
| 2006/0145427 A1* | 7/2006 | Sueda | 277/594 |
| 2006/0175763 A1 | 8/2006 | Duckek et al. | |
| 2007/0013145 A1 | 1/2007 | Detmann et al. | |
| 2007/0096401 A1* | 5/2007 | Sueda | 277/595 |
| 2007/0210532 A1 | 9/2007 | Hegmann | |
| 2009/0224486 A1 | 9/2009 | Tiefenbach et al. | |

FOREIGN PATENT DOCUMENTS
DE    21 118 610 A1    10/1972
(Continued)

*Primary Examiner* — Gilbert Lee
(74) *Attorney, Agent, or Firm* — Marshall & Melhorn, LLC

(57) ABSTRACT

The invention relates to a metallic flat gasket (1) with at least one gasket layer (2), in which at least one through opening (3) is present, which is surrounded by a sealing area (4), in which at least one elastically deformable element (5) surrounding the through opening (3) is arranged, and an optional, at least one functional area (6) with at least one elastically deformable sealing or supporting element (7), which does not separately surround a single through-opening, where outside of the at least one sealing area (4) and the optional at least one functional area (6) on at least one of the surfaces (21, 22) of at least one of the gasket layers (2) an area is surface structured in such a way that the gasket layer (2) in this area has a thickness that is larger than the original thickness of the gasket layer (2). The surface structured area (8) covers the at least one surface (21, 22) outside of the sealing (4) and the functional area (6) at least in regions and the surface structure is formed by alternating depressions (9) and protrusions (10) which run on at least one cohort of essentially parallel, straight virtual lines extending over the total area of the structured area (8).

23 Claims, 9 Drawing Sheets

FOREIGN PATENT DOCUMENTS

| | | |
|---|---|---|
| DE | 20 2006 003 678 U1 | 5/2006 |
| EP | 1 577 589 A1 | 9/2005 |
| EP | 1 635 093 A1 | 3/2006 |
| ES | 2271854 T3 | 4/2007 |
| WO | WO 95/22020 A1 | 8/1995 |
| WO | WO 2004/076893 A1 | 9/2004 |

* cited by examiner

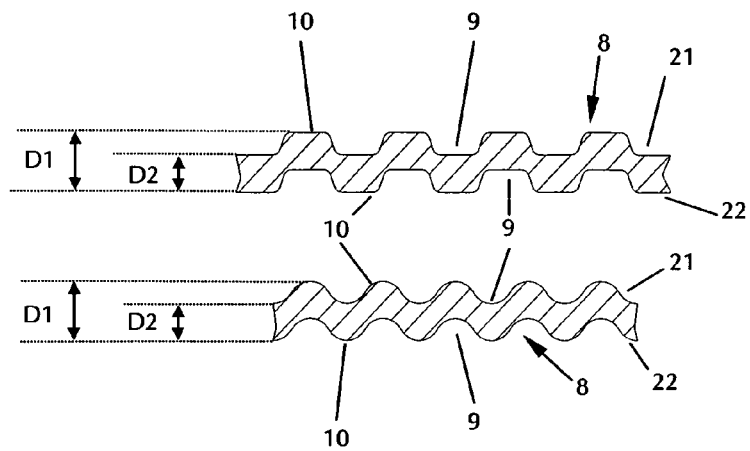
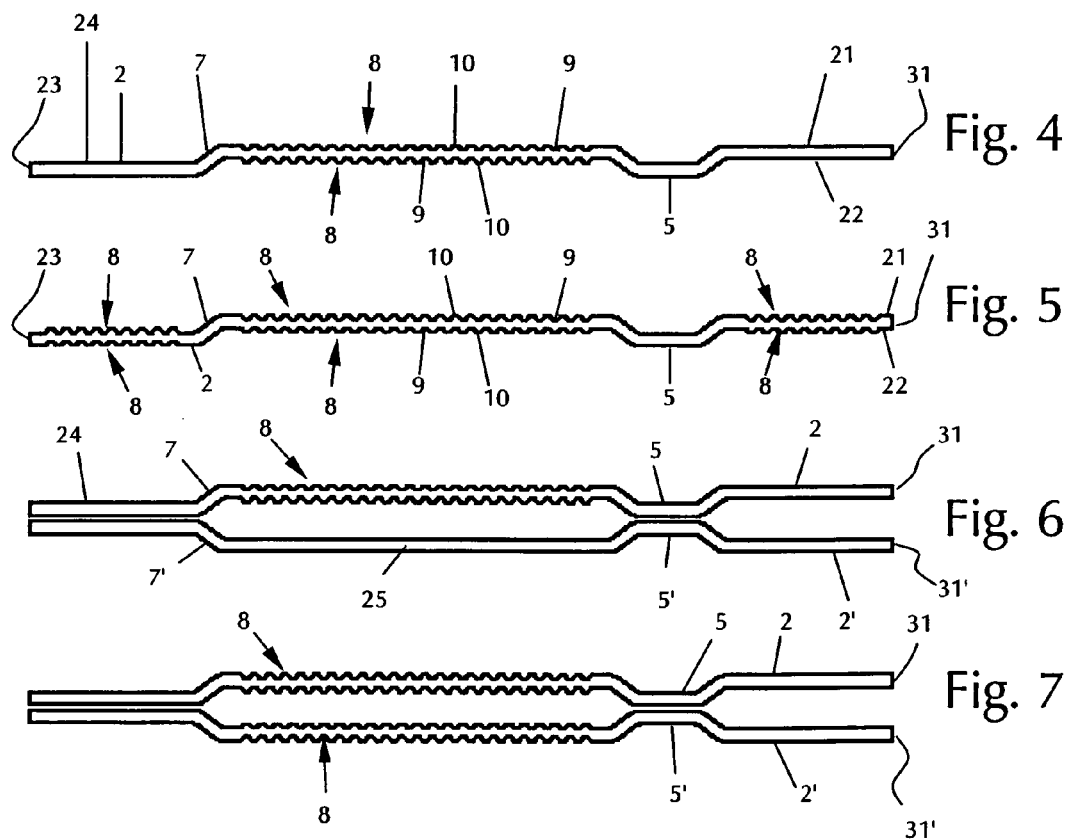

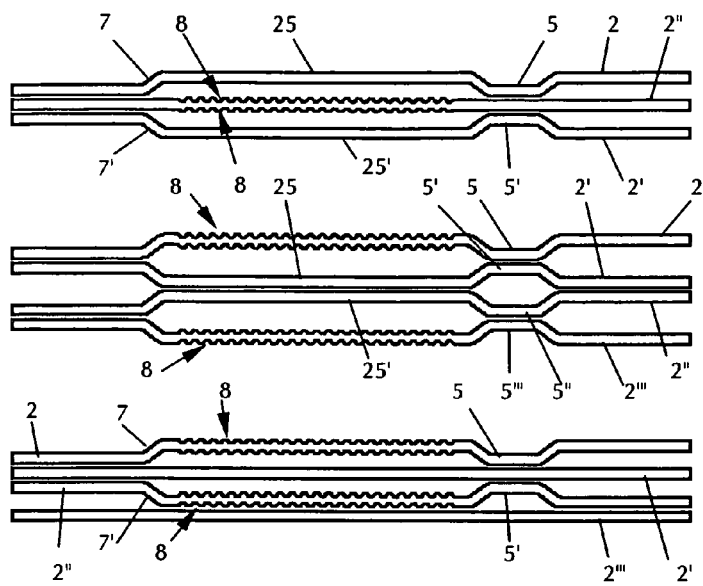
Fig. 8
Fig. 9
Fig. 10
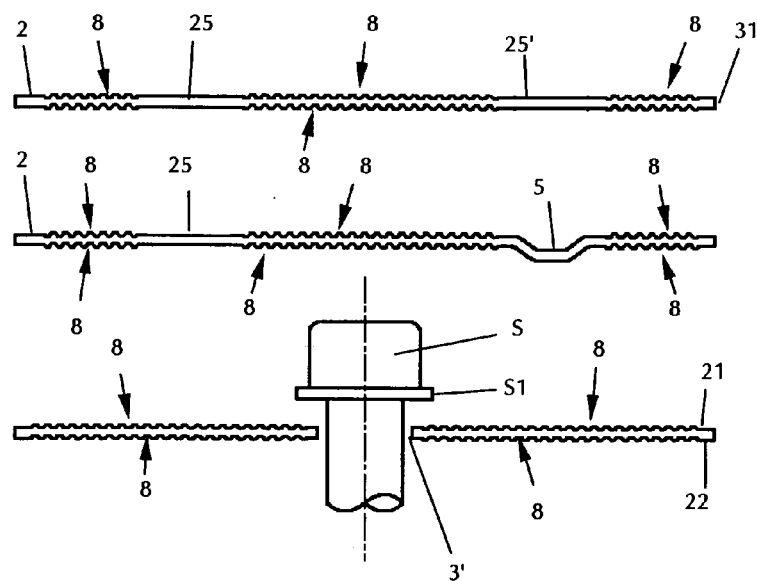
Fig. 11
Fig. 12
Fig. 13

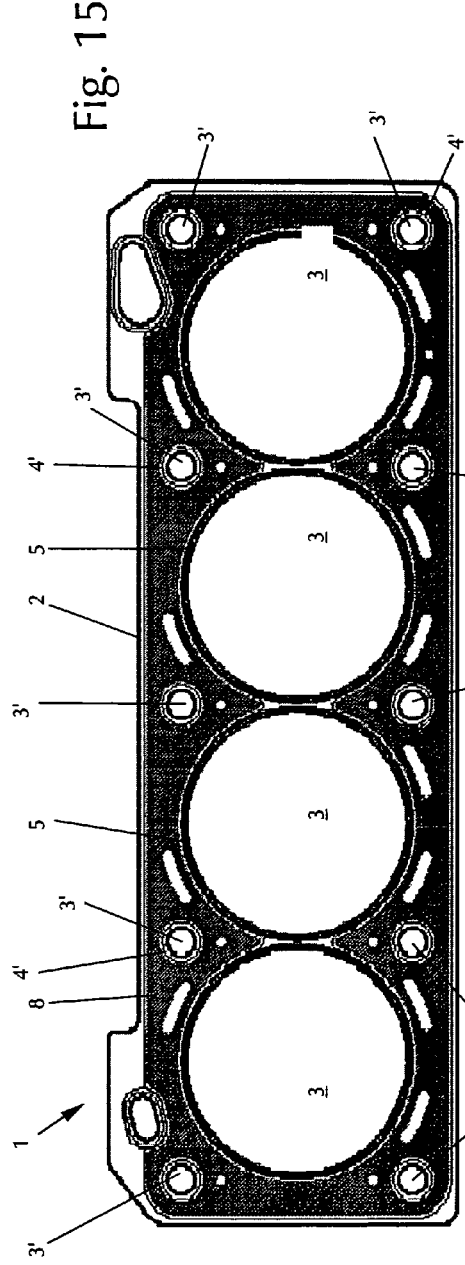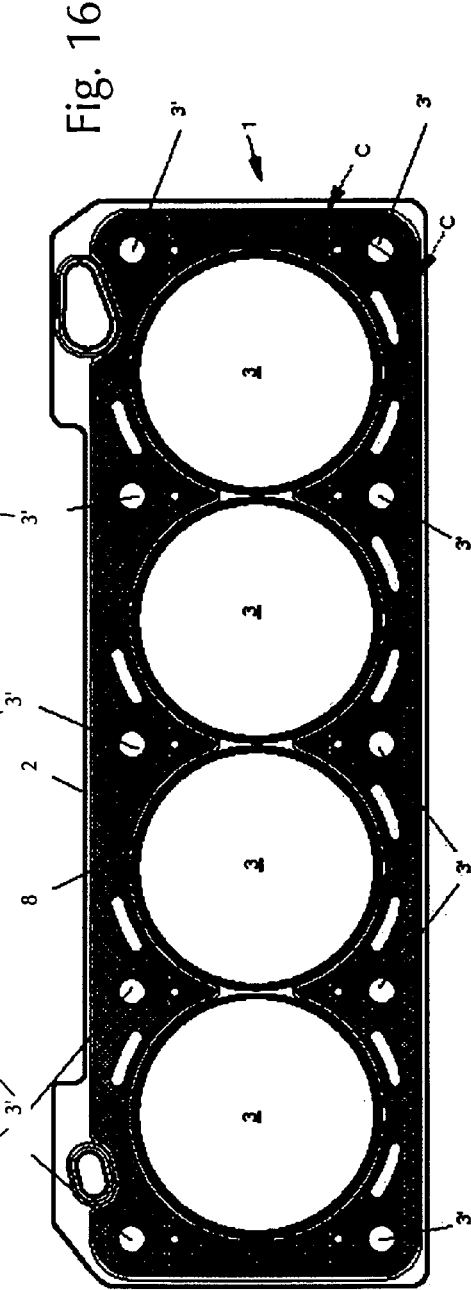

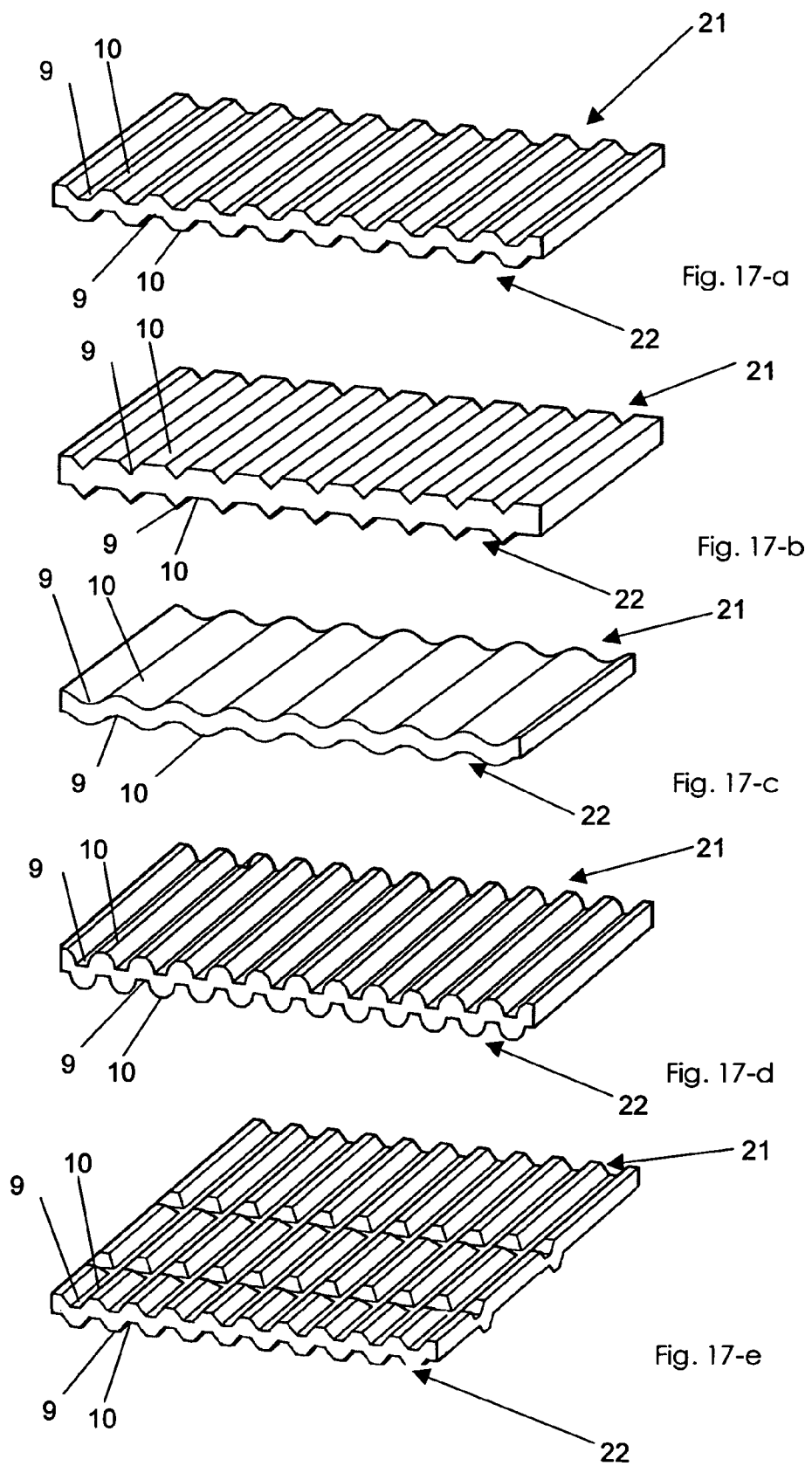
Fig. 17-a
Fig. 17-b
Fig. 17-c
Fig. 17-d
Fig. 17-e

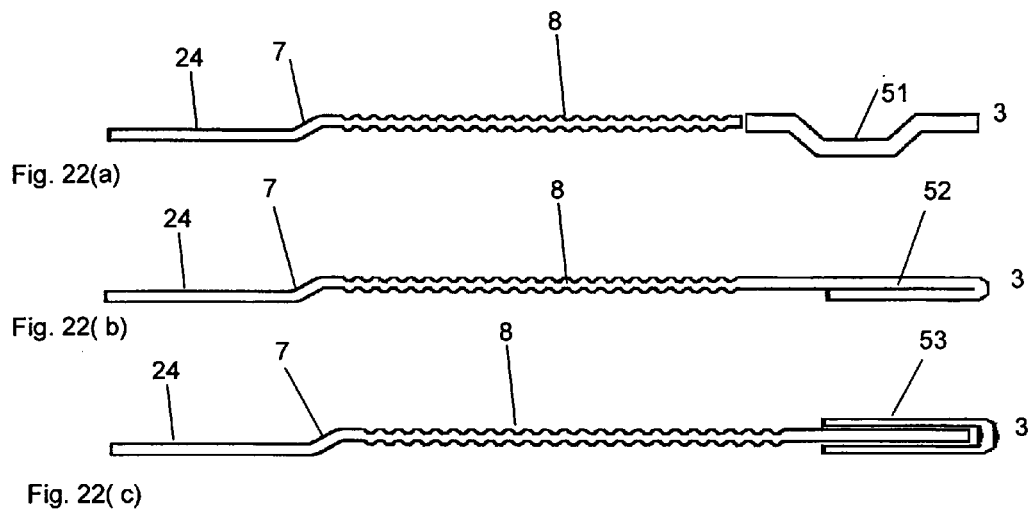
Fig. 22(a)
Fig. 22(b)
Fig. 22(c)
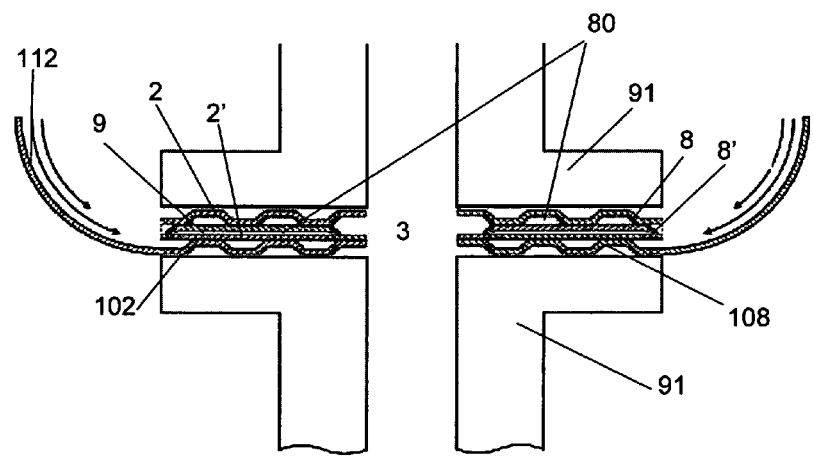
Fig. 23
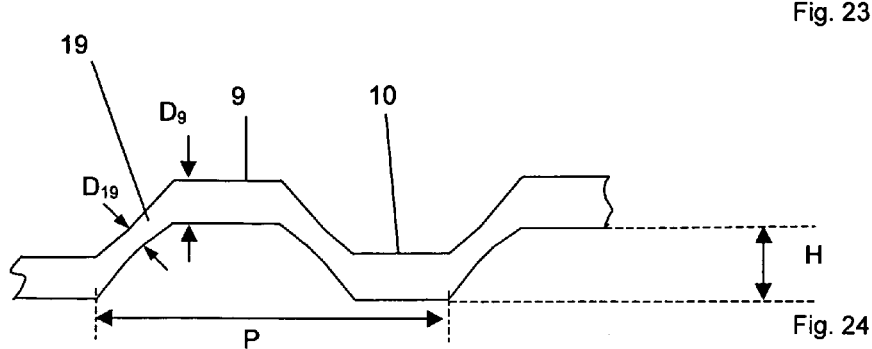
Fig. 24

METALLIC FLAT GASKET

The invention refers to a metallic flat gasket with at least one sealing layer, in which at least one through opening is present, which is surrounded and sealed by at least one resilient sealing element arranged in a sealing area. In addition, at least one further resilient sealing element may be present in at least one functional area, which does however not individually encircle a single through opening. Outside of the at least one sealing area and the optional functional area, the gasket comprises an area with a structuring on at least one of its surfaces. This surface-structured area has a greater thickness than the original thickness of the gasket layer, in which the surface structuring is formed.

BACKGROUND OF THE INVENTION

Such areas with increased thickness in gaskets, especially in cylinder head gaskets usually serve as support. It is for instance known from WO 2004/076893 A1 or EP 1 577 589 A1 to support the beads sealing the combustion openings of the cylinder head gasket by thickened and surface-structured areas which run along the combustion chamber openings, the thickening being achieved through embossing. In addition, the documents mentioned also describe that in areas distant from the combustion chamber openings and closer to the outer edge, the areas also referred to as backland of the gasket, corresponding supporting structures may be present as well. These supporting means consist in undulating or checkerboard like embossments of the gasket layer, in which the depressions and protrusions alternate with each other. The backland support elements do not however serve as so called stoppers, which prevent a complete deformation of the resilient beads, but rather as local height adjustment elements. Preferably, these height adjustment elements extend along the outer edge of the gasket, preferably at the shorter edge. The height adjustment elements mainly aim at preventing shape distortions on the areas to be sealed, especially of the cylinder head. The simultaneous presence of supporting elements and height adjustment elements both along the combustion chamber openings and the backland of the gasket constitutes a considerable improvement compared to such gaskets in which the resilient combustion-chamber beads are accompanied by supporting elements on the side of the combustion chamber only. Nevertheless, even with both supporting elements and height adjustment elements, shape distortions can not always completely and reliably be prevented.

It is therefore the object of the invention to provide a metallic flat gasket which reliably prevents shape distortions of the areas between which the gasket is installed. The gasket shall be easily and inexpensively produceable and adaptable for various kinds of surfaces to be sealed.

The solution of this object is achieved by a metallic flat gasket according to claim 1. Preferred embodiments are described in the subordinate claims.

BRIEF SUMMARY OF THE INVENTION

The invention thus refers to a metallic flat gasket with at least one gasket layer, in which at least one through opening is present. This through opening is surrounded by a sealing area, in which an elastically deformable sealing element is present, which encloses the through opening. The gasket layer can also include a functional area, in which at least one elastically deformable sealing or supporting element is present as well, which however does not encircle single through openings separately. A typical example of a functional area is a sealing bead, which runs along the outer edge of a gasket or an elastomeric sealing lip extending in the same area. Outside of the at least one sealing area and the optional at least one functional area, the flat gasket shows at least one area that is structured. In this area, the thickness of the gasket layer is greater than its original thickness, meaning that the layer in total is thicker than its local material thickness. The structure consists of alternating depressions and protrusions, which are arranged in such a way that they are on a cohort of virtual straight lines, which run essentially in parallel over the total extension of the structured area. The area covered by the structuring covers those surfaces of the gasket which do neither belong to the sealing area nor to the functional area at least in areas. In a preferred embodiment, it essentially completely covers the area neither belonging to the sealing nor to the functional area.

Several arrangements of the structuring are possible in principle. The structuring in a first embodiment surrounds the bolt holes by more than 50% of their circumference, in a second embodiment it extends in the area between main trough openings and outer edge of the gasket over at least 50% of the circumference of the gasket. If it extends between major through openings and outer edge of the gasket, along the complete shorter edge of the gasket, it is sufficient to extend only in this area. The structuring may however also encircle the bolt holes by at least 50% of their circumference and extend between the major through openings and the outer edge of the gasket. The width of the structuring is only slightly changing in most situations. If the structuring is for instance extending between the main trough openings and the outer edge of the gasket, its width will only change as a consequence of the presence of further openings and functional areas. In general, the width over 70% of the length/circumference of the structuring is changing by 40% or less. In the embodiments described until now, the structuring is covering a defined, limited area of the surface in order to adjust their height in such a way that shape distortions are prevented completely.

In a further embodiment, in order to prevent shape distortions of the parts to be sealed, it is necessary that the structured area covers the surface of the gasket in the areas outside of the sealing area and the optional functional area essentially completely. An essentially complete coverage of the surface with the structuring means in the context of this invention that at least 70% of the area of the gasket are covered with the structuring, which remains after subtraction of the at least one sealing area and the optional at least one functional area. The sealing area is defined as the area extending from the through opening to the outer edge of the sealing element enclosing the through opening. In case of a bead as sealing element enclosing the through opening, the sealing area is the circular area that extends from the outer edge of the trough opening to the outer foot of the bead. The area of the functional area corresponds to the area used by the elastically deformable sealing or supporting element arranged in this area. In case of a half or a full bead, this is the area that extends between the feet of the bead along the total length of the bead or in case of a half bead the area of its ramp. An example for a functional area is a sealing bead, which simultaneously encircles several through openings. Such constructions are commonly used for the sealing of oil or cooling water through openings in cylinder head gaskets. This version also covers a full or half bead running along the outer edge of a gasket layer thereby encircling several through openings in the inner area of the gasket layer. A further example of a functional area is an area in which a non-circular bead is arranged, thus a bead with open ends which has no sealing function but only serves as supporting element for the adjacent areas of the gasket. The gasket may also show elastomeric lips as sealing or supporting elements instead of beads. In an advantageous embodiment, the structuring extends over at least 80% and more advantageously over more than 90% of the area of the gasket layer outside of the sealing and the optional functional area. Thus, the structured areas cover at least 50%, advantageously more than 60% and most advantageously more than 70% of the total area of the gasket layer including the sealing and the functional area. The above specifications with respect to the areas always only refer to the area actually present, thus the areas of the through openings are not considered.

According to the teaching of the invention, the structuring covers an essential part of that area of the gasket layer not used for elastically deformable sealing or supporting elements. Preferably, the structuring directly borders to the at least one sealing area and the optional at least one functional area or keeps a rather small distance to this, e.g. 0.3 mm to 3 mm, preferably 0.5 to 2 mm and most preferably 0.5 to 1.5 mm. If several sealing areas or several functional areas are present, the structuring approximates them as close as possible. As close as possible here means that the functioning of the elastic sealing elements must not be affected by the structuring. The structuring preferably also extends up to the outer edges of the gasket layer except if these areas are sealing or functional areas.

In the flat gasket according to the invention, at least a part of at least one of the gasket layers outside of its sealing or functional areas is covered by the structuring. In these structured areas the gasket layer has a greater thickness than the original thickness of the gasket layer, thus the thickness of the flat gasket layer before the introduction of the structuring. The thickness of the gasket layer is thereby measured as the distance between two tangential layers, which both run in parallel to the plane of the non-deformed gasket layer and which abut to the opposite surfaces of the structured gasket layer, respectively. The thickness in the structured area is thus not measured from the depressions in the surface, but from the protrusions present. As the structuring in the structured areas ranges over the complete cross section of the gasket layer, the thickness is measured as the distance between two planes which abut to the protrusions of the respective side of the gasket layer. However, the height of the protrusions does not have to be constant in the entire structured area. In any case, the structured area is actually thicker than the original thickness of the non-shaped gasket layer. Depressions have to be understood as areas which are lower with respect to the protrusions, they do not necessarily have to be recessed with respect to the plane of the non-shaped gasket layer. Even with a symmetrical formation of the structuring on both surfaces of a gasket layer, the local material thickness at the depressions and protrusions is almost identical to the original thickness—in fact it is slightly reduced—of the non-treated gasket layer, the thickness of the gasket layer as such is however increased.

In many gaskets, it may be sufficient to design individual areas with the surface structuring. The structuring can for instance be used to adapt the pretension targetedly for the parts to be sealed by means of a structuring in the area of the bolt openings or the outer edges of the gasket.

In other cases, it can be advantageous to provide the areas outside the sealing and the optional functional area completely or almost completely with the structuring. The structured area then constitutes a supporting area which offers an improved supporting effect compared to supporting means present only at restricted local areas. As a consequence, the structured area effectively counteracts distortion in the areas to be sealed. The height of the protrusions in the structuring can be deliberately adapted to the topography of the surfaces to be sealed and their rigidities. In this way, the bolt forces affecting the metallic flat gasket can be set up more targeted and therefore be reduced in total.

The depressions and protrusions forming the structuring are arranged alternatingly on a cohort of essentially parallel, straight lines. These straight lines continuously proceed in the extension direction of the depressions. This means that the depressions and protrusions are distributed rather regularly over the whole area covered by the structuring, which facilitates the manufacturing of the structured area. In the cohort of essentially parallel straight lines, the straight lines are virtual lines. These lines indeed proceed over the whole region of the structured area, but this does not necessarily mean that at each spot of these lines depressions or protrusions are present. The virtual lines may for instance intersect with a sealing or functional area, in which according to the invention, no such structuring is present or with a local area that needs no support since the parts to be sealed in this region are extraordinarily rigid. In such a case the protrusion(s) and/or depression(s) run on a virtual line up to the respective area, are discontinued and continue on the other side of the respective area on the same virtual straight line. The cohort of essentially parallel, straight lines is thus given over the entire area of the gasket layer while the depressions and protrusions actually only follow these lines in the subareas described. Neighboring protrusions are separated from each other by depressions. The lines being essentially parallel means that they may deviate from being parallel by an angle of at the most 5° and preferably at the most 2°.

In a first embodiment of the metallic flat gasket according to the invention, the protrusions proceed along only one cohort of parallel lines. One line corresponds to a protrusion and the neighboring line to a depression, so that the structuring consists of essentially parallel, straight protrusions with intermediate grooves and in total possesses an undulating structure. It is preferred that all protrusions have an identical breadth and are arranged with identical distance to each other. The same is also preferred for the grooves. It is however also possible to chose different distances between the protrusions and different breadth of the protrusions and the grooves.

Depressions and protrusions may also alternate in their extension direction. For example, the depressions and protrusions on both sides of a non-symmetric sealing element (e.g. a half bead) which is intersected by the virtual lines on which the depressions and protrusions are located may be arranged in such a way that a protrusion on one side of the sealing element is continued on the other side as a depression and vice versa.

In a further embodiment of the invention, the depressions are arranged along several cohorts of virtual straight lines with the cohorts intersecting with each other. The intersecting depressions result in protrusions arranged between them, which do not continuously extend over the whole structured area but consist only in subareas. It is preferred that the lines intersect at an angle of 30 to 150°, preferably 45 to 135°, more preferably 80 to 100° and most preferable of 90°. The latter results in a structuring corresponding to a checkerboard pattern. It is preferred that the protrusions run on two cohorts of parallel lines. It is however possible as well that the protrusions run on three cohorts of straight lines, which preferably intersect at an angle of 60°. This results in a web-like pattern of the structuring.

The depressions may also be arranged in such a way that they run on more than three cohorts of virtual straight lines. This results in a great variety of shapes for the depressions as well as for the protrusions arranged between them. The cross sections of the depressions and protrusions may be designed in a large variety, too. The cross section perpendicular to the extension direction of the virtual lines may be trapezoidal, triangular, rounded or rectangular. For ease of manufacturing, it is preferred that all depressions have the same cross section. The depth of the depressions (the height of the protrusions, respectively) may be varied as well. It is however preferred that all depressions have the same depth. The depth is defined as the distance between the highest point of a neighboring protrusion to the deepest point of a depression on one surface of the structure and measured perpendicular to the plane of the gasket layer.

There is a comparable scope of design for the shape and dimensions of the protrusions in the structured area. The cross section of the protrusions can for instance be camber shaped, rectangular, triangular or trapezoidal. A preferred form is the stump of a polyhedron. While the protrusions can have an equal height over the entire structured area, it is however preferred that their height alters across the area. The height is designed depending on the application of the gasket. Due to the higher thickness of the gasket layer in the structured area compared to the original thickness of the gasket layer, the structured area is especially suited as a supporting means for elastic sealing elements and at the same times allows a targeted distribution of the surface pressure, which results from the forces introduced via the fixation bolts. The structured area can be designed in such a way that it acts as a deformation limiter for neighboring elastic sealing elements, e.g. beads or elastomeric lips, and prevents that they are flattened more than allowed during their use. The structured area is also generally suitable for applications with secondary loading of introduced forces as it takes up a portion of the forces and prevents that other areas of the gasket layer be charged excessively by those forces. Due to the use of the structuring, it is also possible to save material, since the increased effective thickness of the area of the gasket layer is produced from a thinner material without the need for additional material. The structured area can therefore also be used for thickening the area as a compensation for an additional overlay. In this way, it allows to reduce the manufacturing cost of the gasket. The increase of surface resulting from the structuring provides for further advantages, such as an improvement of the adhesive properties on this structured surface. This allows for an improved adhesion of plastics on the metallic gasket layer, both for the optional application of coatings and of elastomeric lips as sealing elements.

According to the scopes of use described above as well as to further possible scopes of application, the height of the protrusions (depth of the depressions) may vary over the entire area of the gasket which is covered with the structuring. The height may already be established during the manufacturing of the protrusions or by a planishing which may affect the entire structured area or only portions of it. The height there is adapted to the rigidity of the corresponding area of the parts to be sealed, e.g. an extraordinary rigid area will be sealed by an area of the gasket which is less high than the one sealing an especially soft area. In the same way, the height of the structure often increases with an increasing distance from the bolt openings. A deliberate distribution of different heights in the structuring over the entire structured area adapted to the local sealing gap allows for an almost complete prevention from shape distortions. It is thus possible to design a topography of the structuring which is adapted to the sealing gap. These adaptations can be used for rather small structured areas, they are however preferably used with more extended surface structurings. Compared to the narrow circular or linear deformation limiters known from the state of the art, the extension of the structuring in general allows for a considerably larger scale of variability. The main advantage is however in a continuous adaptation over a larger area.

It is advantageous to manufacture the structuring according to the invention in the metallic flat gasket according to the invention by embossment. The structuring in the context of this invention comprehends all kind of material deformation which starting from a gasket layer with a distinct thickness only by use of material from this gasket layer results in an effective thickening in the structured area. The material thickness as such is not thickened but due to the lengthening is slightly reduced. It is rather the thickness of the layer that is increased. The structuring may thus also be obtained for instance by coining or deep drawing, which leads to protrusions with a trapezoidal, triangular or rounded profile or by extrusion or other methods of displacement of material which displaces material from the depressions to be produced and results in the protrusions.

The invention is not only suited for one-layer gaskets but also for multi-layer ones. For the latter, it is possible to provide the structuring on different layers than the elastically deformable sealing elements and the functional areas, which are kept free from the structuring. This regional separation of structured areas on the one hand and sealing and functional areas on the other hand is maintained when the different structures are distributed on different gasket layers. In practice this means that the gasket layer with the structuring shows no structuring in those areas which abut to sealing or functional areas in the neighboring gasket layer. In a gasket with more than one gasket layer arranged essentially in parallel to each other, a parallel projection of the sealing and functional area to the parallel layers results in areas which are free from the inventive structuring.

Especially if the structuring is introduced on both surfaces in such a way that the depressions on one surface are situated opposite to protrusions on the opposite surface, the transition area between a depression on one surface and the neighboring protrusion on the same surface—in the following referred to as flange—may be designed in such a way that the material in the area of the flange is reduced compared to the material thickness in the area of the protrusions and depressions, so that the structured area is stiffened. The material thickness reduction in the flange area is at least 8%, preferably at least 10%, more preferably at least 13% and most preferable at least 15% compared to the material thickness in the area of neighboring protrusions or depressions, respectively. It is also feasible to alter the degree of tapering over the structured area in order to adapt the resiliency of the gasket.

Although at first sight, the elements of the structure may resemble a bead, they have less resiliency than the latter, which is also due to the tapering. Moreover, their width is smaller than the one of a bead. This can for instance be shown with respect to the thickness of the gasket layer. The ratio between the width of a bead (starting from the point where it raises out of the plane) and the thickness of the unstructured gasket layer is at least 6, preferably at least 7. In contrast, the ratio between a period of the structure is at the most 4, preferably between 2.5 and 3.5.

In general it is also possible to distribute the structured area among two adjoining layers so that they supplement each other with respect to at least one of area and height. An addition of the thicknesses of the structurings of two adjoining gasket layers may be especially useful if a large increase of the thickness is necessary but the material necessary for the thickening cannot be obtained from one single layer. The design of the structuring in the different layers may then be comparable or different. Complementary structures in adjoining surfaces may engage with one another. It is also possible to design in the adjoining layers non-complementary structures or structures which are complementary in regions only.

The gasket layers may be coated with the coatings known from the state of the art. While it is often preferred to only partially coat the structured areas after the introduction of the structure, it is also possible here to emboss the structure in a pre-coated or even coil-coated metal sheet.

The invention may be used for the most varied one- or multi-layer metallic flat gaskets. It is especially preferred for cylinder head gaskets, manifold gaskets and flange gaskets. The term flat gasket explicitly also encloses such three-dimensionally deformed gaskets, which have been formed from a two-dimensional body, e.g. conical gaskets.

BRIEF DESCRIPTION OF THE DRAWINGS

The following sections describe the invention on the example of a cylinder head gasket by reference to some drawings. The examples shown are for demonstration purpose only, the invention is not restricted to them. The figures, which use the same reference numbers for identical parts, show schematically:

FIGS. 2 and 3 sectional views along line A-A in FIG. 1 where the two examples show differently designed structurings;

FIGS. 4 to 12 sectional views along line B-B in FIG. 1;

FIG. 13 a sectional view along line C-C in FIG. 16;

FIGS. 15 and 16 top views of a cylinder head gasket as examples for the gasket according to the invention;

FIG. 17 in five partial FIGS. 17-a to 17-e possible embodiments for surface structured areas;

FIG. 22 in three figures sectional views of at least one layer of a flat gasket according to the invention with a stopper element at the edge of the through opening;

FIG. 23 a sectional view of an exhaust gasket with a deflector for guiding air and FIG. 24 a cross section comparable to FIGS. 2 and 3.

DETAILED DESCRIPTION OF THE INVENTION

Figure 1:
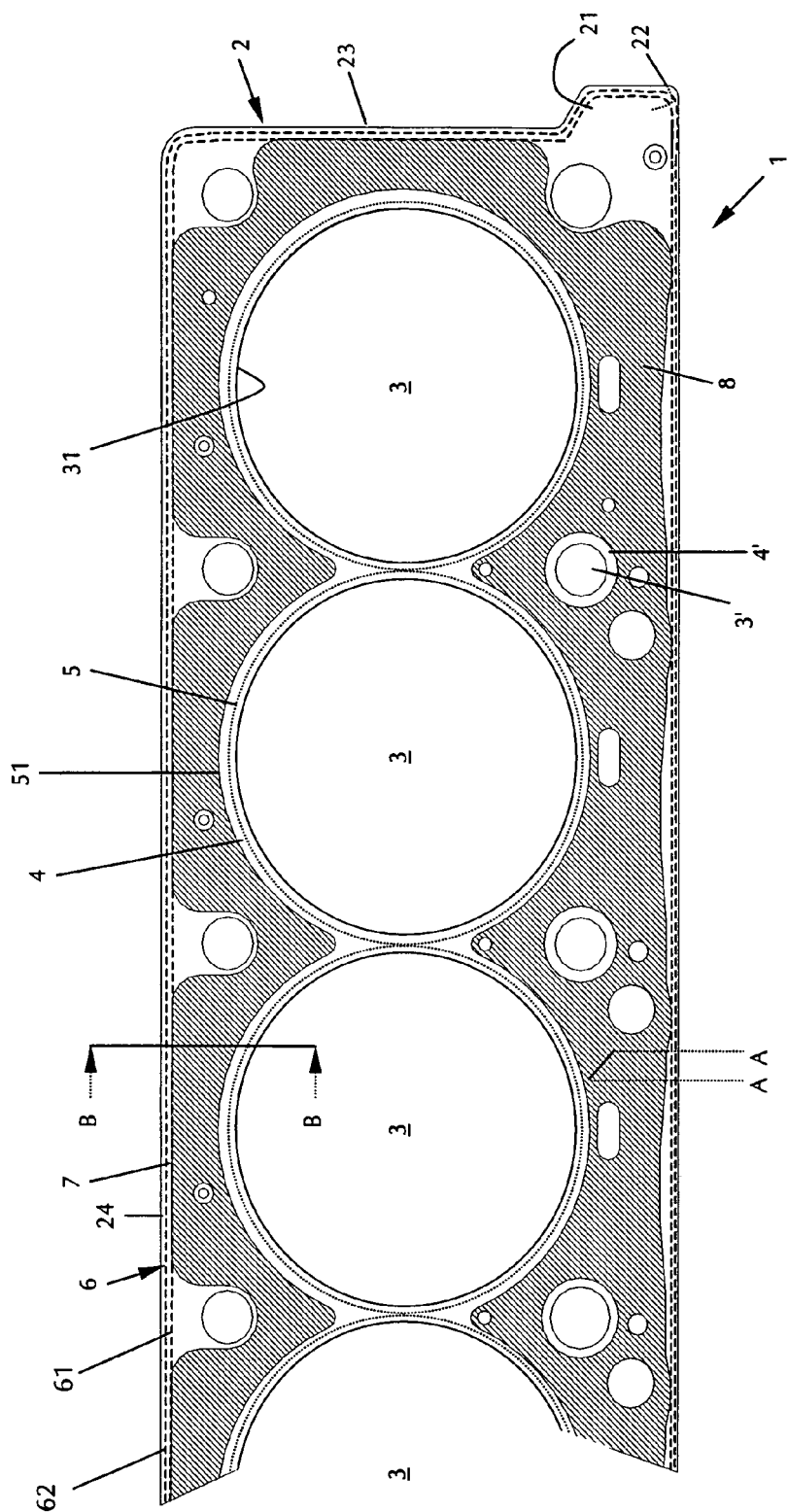
FIG. 1 a partial top view of a cylinder head gasket according to the invention.

FIG. 1 shows a partial top view of a cylinder head gasket 1 with a single metallic layer 2. In this gasket layer, four combustion chamber openings are given, one of them on the left hand side being only partially shown. The combustion chamber openings 3 are each surrounded by a circular sealing area with a circular bead 5. The dotted lines show only the course of the peak of the bead. In the area between the combustion chamber openings 3, the beads 5 combine to a joint bead section. The sealing areas 4 therefore result in a spectacle-like shape and extend from the edge 31 of the combustion chamber openings 3 to the outer feet of the bead, the position of which is designated by line 51.

In the so-called backland of the gasket layer 2—in the area between the feet of the beads 51 and the outer gasket edge 23, further through-openings are present in the shape of screw openings, water- and oil openings, which are however not identified individually. Some of these through openings 3' are surrounded by sealing areas 4' as well, in which an elastically deformable sealing element such as a bead or an elastomeric lip (not shown) are present. Apart from the sealing areas 4, the gasket also shows a functional area 6, with a half bead 7 which constitutes a step in the direction of the outer edge 23 but is not depicted in detail and runs along the outer edge 23 of the gasket layer 2. The functional area 6 runs strip shaped along the gasket edge 23 between the inner and outer foot of the half bead 7. The area is marked by dotted lines 61 and 62. The functional area does not run directly at the outer edge 23 of the gasket but at a distance to it. Between the outer edge 23 and the outer foot of the bead (dotted line 62) a flat area 24 is situated. This area 24 and the regions in between the dotted lines 61 do not belong to the functional area 6.

According to the invention, a structured area 8 is present outside of the sealing area 4, 4' and the functional area 6. This structuring is indicated in FIG. 1 by a hatching. As can be seen from FIG. 1, there is no link between the ends of depressions or protrusions, respectively. As can be seen from FIG. 1 as well, the structured area in this embodiment extends at large scale over the so-called backland of the gasket layer and covers it essentially completely. This means that at least 70%, preferably more than 80% and most preferably more than 90% of the area of the gasket layer outside the sealing areas 4, 4' and the functional area 6 have the structuring. The structuring 8 crosses the whole thickness of the layer in the respective area from surface 21 to the backside surface 22. If the entire extension of the gasket layer is considered, thus without subtraction of the sealing and functional areas, at least 50%, preferably at least 60% and most preferably at least 70% of the surface of the gasket layer are covered by the structuring in this embodiment.

The course of the structure from the lower left to the upper right also clarifies the progress of the protrusions 9 and the depressions 10 along the area 8. The depressions 9 run as straight extended grooves, the protrusions 10 as straight extended ribs over the entire structured area 8 and are only interrupted by the through-openings and if present by the sealing elements surrounding them FIGS. 2 and 3 show two different cross sections of the depressions and protrusions in the structured area 8 in a sectional view along line A-A in FIG. 1. In the embodiment according to FIG. 2, both the protrusions 10 and the depressions 9 show an essentially trapezoidal cross section. The flanges of the trapezoidal cross section, as is preferred, do not extend vertical, but at an angle of at least 10° relative to the vertical direction, thus allowing for a transition region. The peak areas of the protrusions 10 are essentially flat. In the embodiment according to FIG. 3, the cross sections of the depressions 9 and the protrusions 10 are rounded. In both embodiments the linear structure of the structured area is arranged in such a way that a depression 9 on the upper side 21 corresponds to a protrusion 10 on the lower side 22 and vice versa. This results in an undulating structure. The structured areas may be manufactured by embossing of the gasket layer 2. This leads to an increased effective thickness D1 in the hatched area 8 compared to the original thickness of the gasket layer 2, D2. The material thickness as such is only slightly modified.

FIGS. 4 and 5 show cross sections of a one-layered metallic flat gasket on the example of a cylinder head gasket. The cross sections each show the area between a combustion chamber opening 3, which is situated at the right hand side of the figure, and the outer edge 23 of the gasket layer, situated on the left in the figure. The combustion chamber opening 3 is completely encircled by a bead 5. The outer edge 23 of the gasket layer is completely encircled by a half bead 7 at a distance to the edge and a flat section 24 between the half bead 7 and the edge. The structured area 8 is situated between the half bead 7 and the bead 5. It can be designed as shown in FIG. 2 or 3 and shows alternating depressions 9 and protrusions 10. The gasket layer 2 has a larger effective thickness in the area 8 than in other areas, which is why the structure also acts as a deformation limiter both for the bead 5 and for the half bead 7. Due to the large extension of the structuring 8 across the area of the gasket layer 2 in this embodiment (see also FIG. 1), distortions of the elements to be sealed against each other can effectively be prevented, especially if the height of the structure is modified over the extension commensurate to the width of the sealing gap between engine block and cylinder head in the respective area.

The gasket shown in FIG. 5 possesses more structured areas than the one from FIG. 4. These additional structured areas on the one hand are situated in the area between the bead 5 and the edge 31 of the combustion chamber opening 3 and on the other hand replace the unstructured section 24 between the half bead 7 and the outer edge 23 of the gasket layer.

FIGS. 6 and 7 show two-layered gaskets in a sectional view along line B-B in FIG. 1. The upper gasket layer 2 corresponds to the single gasket layer in FIG. 4 and therefore needs no detailed description. In FIG. 7, the lower layer 2' is arranged in such a way that it is a mirror image of layer 2. In contrast, layer 2' in the example of FIG. 6 shows no structuring. The areas in layer 2' adjoining the structured areas 8 in layer 2 are smooth (indicated by 25).

FIG. 8 shows a three-layered cylinder head gasket in a sectional view along line B-B. The lowest gasket layer 2' corresponds to the lower gasket layer 2' in FIG. 6. The upper gasket layer 2 is a mirror image of the lower gasket layer 2'. A third gasket layer 2" is arranged between layers 2 and 2'. It is structured in the areas between the beads 5, 5', and the half beads 7 and 7' in the adjoining layers but shows no beads of its own. The structured areas 8 extend beyond the neighboring surface of gasket layer 2" and constitute an area of increased thickness. In this way, the structured areas act as deformation limiter for the beads 5, 5', 7 and 7'.

FIG. 9 depicts a four-layer cylinder head gasket in a partial cross section along line B-B in FIG. 1. The gasket corresponds to a mirror-image combination of two gaskets according to FIG. 6. Such four-layered gaskets allow to even seal extremely wide sealing gaps between engine block and cylinder head.

A further example of a four-layered cylinder head gasket is given in FIG. 10. In order to increase the total thickness of the gasket, two so-called distant layers which have not structure or sealing elements on their own are used in this gasket only for the increase of the total thickness. A first distant layer 2' is arranged between two gasket layers 2 and 2" which among themselves are mirror images. These two gasket layers correspond to layers 2 and 2' in the gasket according to FIG. 7. The second distant layer 2''' is arranged below layer 2".

FIGS. 11 to 13 show further sectional views of one-layered cylinder head gaskets. FIGS. 11 and 12 are sections of the gasket between two neighboring through openings or a through opening and the outer edge of the gasket. Both gasket areas resemble in principle the section shown in FIG. 5. In contrast to the latter, the gasket in FIG. 11 however shows no sealing elements such as beads or half beads so that it is rather used as a gasket layer together with additional layer(s) than as a one-layer gasket. The structured areas 8 are separated from each other by flat areas 25 and 25'.

Instead of a flat area 25' the gasket according to FIG. 12 shows a bead. It is for instance surrounding a through opening which might follow on the right side of the section of gasket layer 2 depicted.

FIG. 13 shows a sectional view of a gasket according to the invention in the area of a bolt opening 3', e.g. a sectional view along line C-C in FIG. 16. The bolt opening 3' is surrounded by structured areas 8. The lower side of the head of the bolt S1, when the bolt is inserted into the bolt hole and tightened (not shown), seats solidly on the structured area 8. In this way, a portion of the forces is introduced into the structured areas 8. Due to the protrusions and depressions, the structured areas have a higher deformability than the flat gasket layer 2. A targeted design of the depressions and protrusions allows a regulation of the forces introduced into the area of the bolt openings 3'.

The structured areas 8 are preferably introduced into the gasket layers through embossment. A suitable embossing die P is shown schematically in FIG. 14. It serves here for the embossment of a gasket layer 2, which resembles the gasket shown in FIG. 11. The embossing die P consists of two plates P1 and P2, the structured surfaces of which point towards each other and have a distance H, with the gasket 1 being placed in between these two forms. The plates P1 and P2 can be moved from and towards each other along the guiding pins P5 using the die shoes P3 and P4 and a press.

Figure 14:
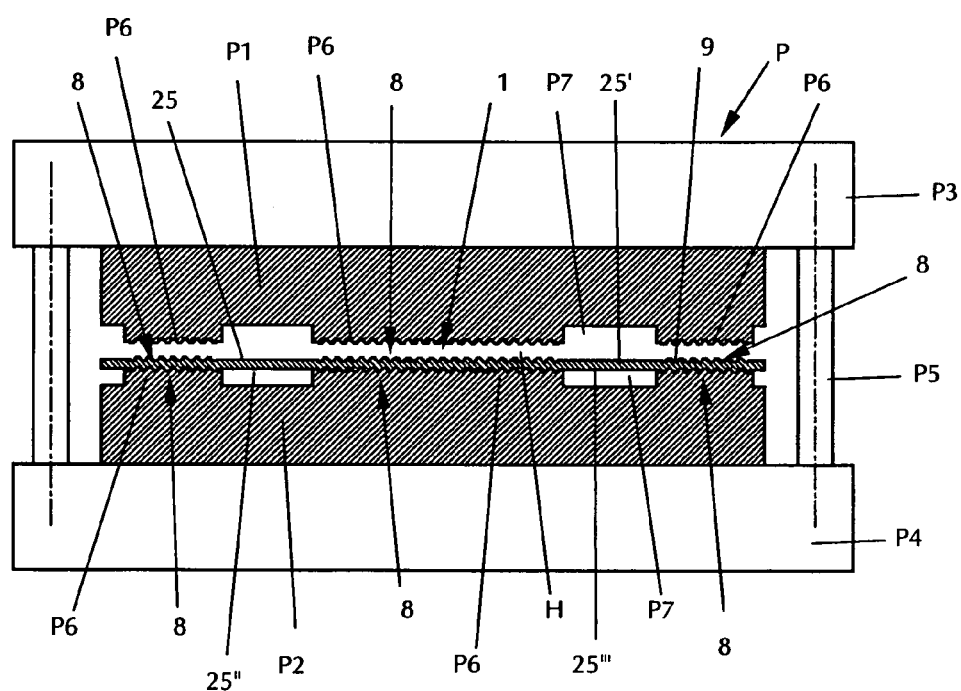
FIG. 14 a sectional view of an embossment tool for the manufacturing of a gasket according to the invention.

For the embossment of the depressions 9 of the structured areas 8 into a pre-form of the gasket layer 2, the plates P1 and P2 show protruding areas P6 on their sides used for embossing with protrusions and depressions which are complementary to the depressions and protrusions in the structured areas 8 in the gasket layer 2. The plates P1 and P2 show clearances P7 in those regions that correspond to the areas in the gasket layer which are to be kept free from structuring so that those areas are not altered by the embossment. When closing the plates P1 and P2, the protruding areas P6 of the plates P1 and P2 impress into the gasket layer 2 and produce structured areas 8. FIG. 14 shows the embossing die P after the embossment and after the plates P1 and P2 have been shifted apart from each other.

FIGS. 15 and 16 give further examples of cylinder head gaskets according to the invention in top view, respectively. Both gaskets resemble the one shown in FIG. 1. In the gasket according to FIG. 15, the bolt openings 3' are surrounded by sealing areas 4' with sealing beads encircling the bolt openings 3'. The bolt openings 3' with their sealing area 4' are all surrounded by structured areas 8, which are extending almost entirely over that area of the gasket layer 2 which is neither sealing area 4, 4' nor functional area.

The cylinder head gasket shown in FIG. 16 distinguishes from the one in FIG. 15 on the one hand by the bolt holes 3' not being surrounded by a bead and therefore by no sealing area. The structured area 8 therefore connects almost directly to the outer edges of the bolt openings 3. On the other hand, the gasket of FIG. 15 only shows one cohort of virtual parallel lines, while FIG. 16 comprises two cohorts of virtual parallel lines, which intersect at an angle of about 90°.

In addition to FIGS. 2 and 3, FIG. 17 shows exemplary perspective sections of the surface-structured areas 8. The protrusions and depressions, respectively, may for instance show trapezoidal (see FIG. 17-a), triangular (see FIG. 17-b) or rounded profiles (see FIG. 17-c). As can be seen from FIG. 17-d, rounded forms may be mixed with straight sections. FIG. 17-e demonstrates how two cohorts of virtual parallel lines intersect. While the lines running from the lower left corner to the upper right corner have a high density, only two of the lines intersecting with them at an angle of about 90° are shown.

Figure 18:
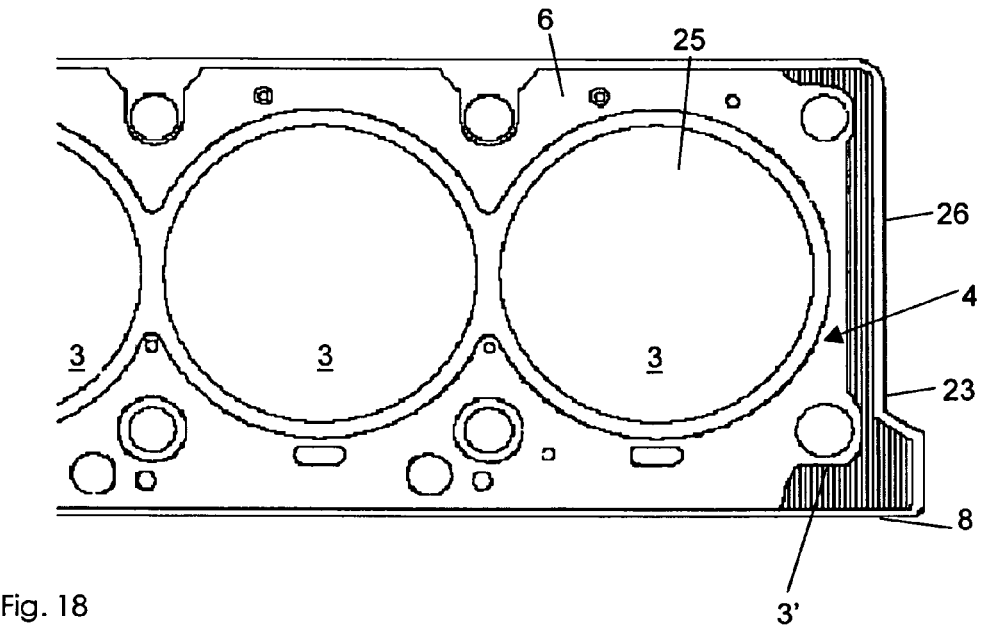
FIGS. 18 to 20 partial top views on cylinder head gaskets as examples for flat gaskets according to the invention.
Figure 19:
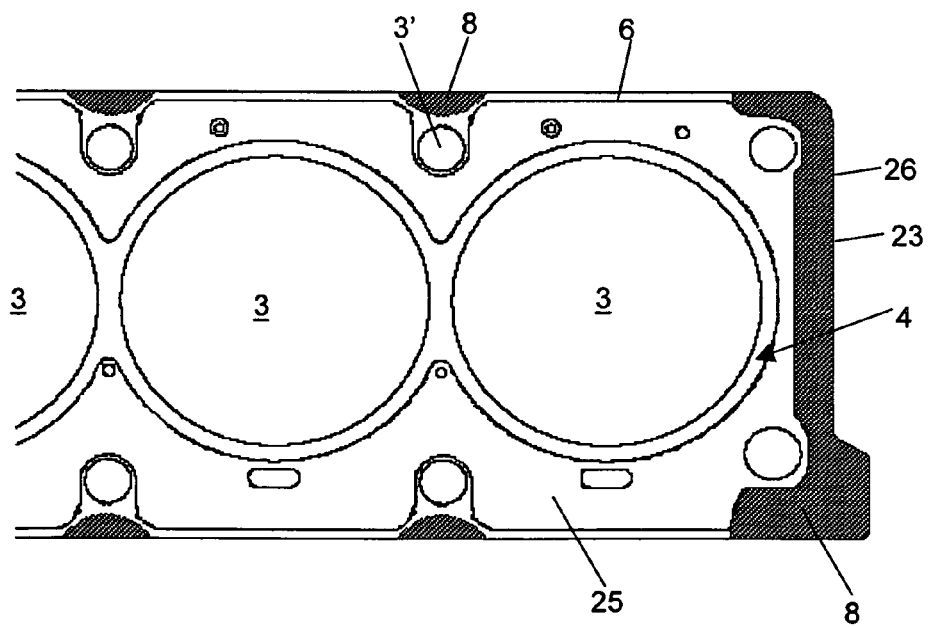
Figure 20:
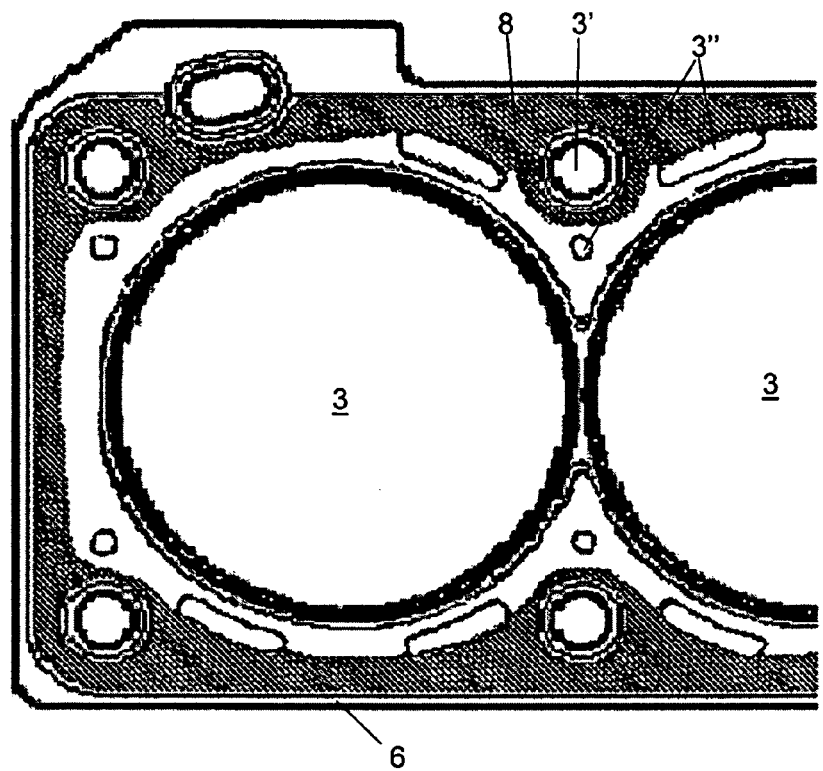

FIGS. 18 to 20 show partial top views on further examples of cylinder head gaskets according to the invention. While the structured area 8 in FIG. 18 is limited to the area close to the shorter end 26 of the gasket edge 23, which considered from the combustion chamber lies behind the fastening holes 3', the example of FIG. 19 shows additional small areas at the longitudinal edge of the gasket in the immediate neighborhood to the holes for the fastening means 3'. In the example of FIG. 19, the virtual straight lines run at an angle of about 45° to the outer edges of the gasket layer, whereas they run in parallel to the shorter gasket edge in FIG. 18. The latter is also true for the embodiment shown in FIG. 20, where the surface structure is arranged like a collar or corona distant to and around the combustion chamber openings 3 and completely cover the area of the fastening means 3', but not the one of the fluid openings 3". The surface structuring reaches to the border of the functional area 6, thus it does not reach beyond the step of the half bead and does not reach to the edge of the gasket. The latter was also true for the example of FIG. 18 but not for the one of FIG. 19 where the structuring is completely situated between the outer edge 23 of the gasket and the half bead 7 of the functional area 6. In all examples, the structuring apart from edge areas tapering off, e.g. triangular edge areas, is such that the length of the structured area in the extension direction is at least 3 times, preferably at least 5 times as large as a period of the structuring reaching from the top of a crest to the top of the neighboring crest of the structuring.

Figure 21:
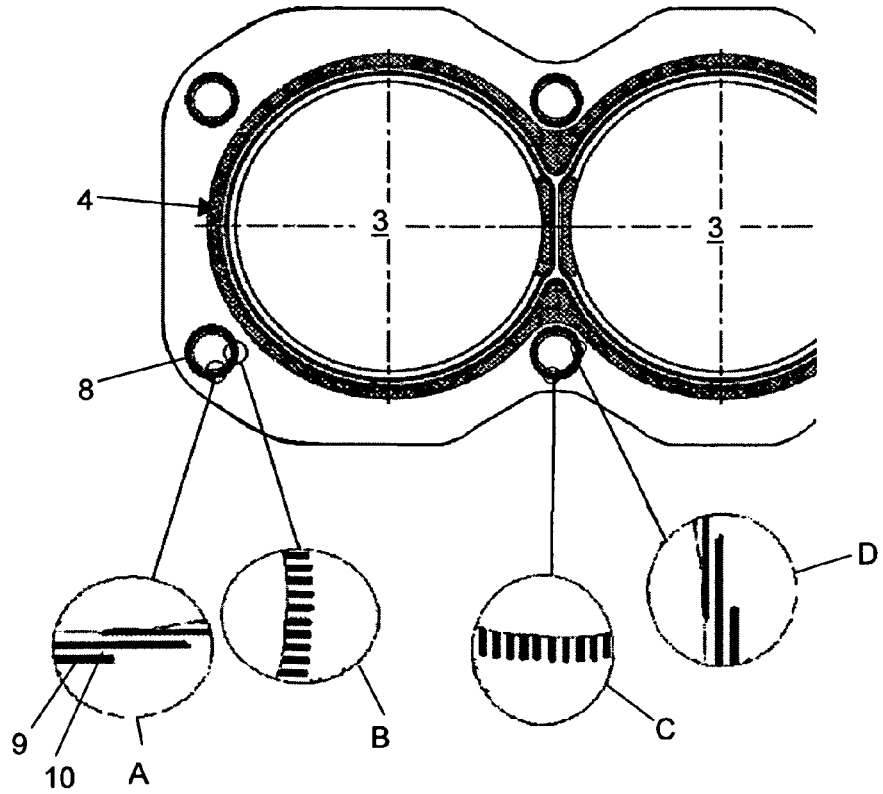
FIG. 21 a partial top view of a manifold gasket as an example for a flat gasket according to the invention.

On the example of a manifold gasket, FIG. 21 demonstrates that the virtual straight lines may only intersect in an area where the structuring as such is not present. As can be seen from the detailed figures A/B and C/D, the cohort of virtual straight lines that defines the direction of the structuring 8 around the through openings for fastening means 3' runs essentially orthogonal to the cohort of virtual straight lines that defines the direction of the structuring 8 around another through opening for fastening means 3'. Outside of the sealing area 4, in the example shown the structuring 8 is only present in a limited area around the holes for fastening means 3'.

FIG. 22 demonstrates that the surface structuring may also be used in combination with various kinds of sealing or supporting elements, e.g. with a separate bead ring, which according to the properties of the material used may be used as sealing element (resilient material) or as a stopper for a sealing element in a further gasket layer, the latter not being depicted. The other two gasket layers show the structuring in combination with classical stopper elements, namely a folded-over stopper or a bended flange, which both act as deformation limiters for a bead in a further layer of the gasket, which is however not shown.

FIG. 23 shows an embodiment of the metallic flat gasket which deviates in two points from the preceding embodiments of the invention. On the one hand, is a multi-layer gasket with three gasket layers 2, 2' and 102. The structuring within each layer consists only of one cohort of virtual straight lines which run in the same direction for structuring 8 and 108, but at a different angle for structuring 8', preferably at a right angle with respect to the other two structurings. The cross section is taken at a position where the structure 8' in gasket layer 2' shows a protrusion 9. Owing to the alternating orientation of the structures 8, 8' and 108, hollow structures 80 are formed in between the gasket layers but also between the outer gasket layers 2, 102 and the flanges of the pipes 90, 91 to be sealed. These hollow structures 80 improve the insulation behavior of the gasket 1. On the other hand, the gasket layer 102 extends over the outer edges of the other gasket layers 2 and 2' with the extending section 112 being bent out of the plane of the gasket. The shape of the extending section 112 is such that it works as a deflector and guides cool air into the hollow structures 80 in between the gasket layers. Therefore, the embodiment of FIG. 23 is preferred for applications with hot gases. While it is preferred to use the bent extending sections 112 only in connection with the hollow structures 80, the latter can be used without the former since it reduces the number of contact points between the gasket layers.

FIG. 24 shows a detail from a region of a gasket layer, in which a structuring 8 is present. Elevations 9 and depressions 10 are embossed into this region. The elevations 9 protrude by a height H beyond the surface of the gasket layer 2. As a result of the embossing, the thickness of the gasket layer 2 in the region of the flanks 19 has been reduced relative to the thickness of the elevations 9 or depressions 10. The thickness $D_{19}$ in the flank region is therefore less than the thickness $D_9$ of the gasket layer 2 in the region of the elevations or depressions. This reshaping of the material and reduction of the material thickness lead to an increase in the rigidity of the structured region. For demonstration purpose, the extent of the flank tapering is exaggerated in FIG. 24. It is frequently between 10 and 25%, in particular between 13 and 19%. FIG. 24 also indicates that a period of the structuring, P, is usually about 2.5 to 3.5 times larger than the original thickness of the gasket layer, H. The ratio P/H in general does not exceed 4.

The invention claimed is:

1. A metallic flat gasket with at least one gasket layer, in which at least one through opening is present, which is surrounded by a sealing area, in which at least one elastically deformable element surrounding the through opening is arranged, and an optional at least one functional area with at least one elastically deformable sealing or supporting element, which does not separately surround a single through-opening, where outside of the at least one sealing area and the optional at least one functional area on at least one of the surfaces of at least one of the gasket layers an area is surface structured in such a way that the gasket layer in this area has a thickness that is larger than the original thickness of the gasket layer, characterized in that the surface structured area covers the at least one surface outside of the sealing and the functional area at least in regions and the surface structure is formed by alternating depressions and protrusions which run on at least one cohort of essentially parallel, straight virtual lines extending over the total area of the structured area.

2. The metallic flat gasket according to claim 1, wherein the depressions and the protrusions are arranged in a staggered manner on adjoining lines.

3. The metallic flat gasket according to claim 1, wherein the surface structuring is formed in an undulating manner from depressions running in parallel to each other with intermediate elevated ribs.

4. The metallic flat gasket according to claim 1, wherein depressions and protrusions alternate in the extension direction of the straight lines.

5. The metallic flat gasket according to claim 1, wherein the surface structuring comprises depressions, which run along at least two intersecting cohorts of virtual straight lines.

6. The metallic flat gasket according to claim 5, wherein the intersecting lines run at an angle of 30 to 150 with respect to each other.

7. The metallic flat gasket according to claim 5, wherein the depressions run along three intersecting cohorts of straight lines, which preferably intersect at an angle of 60°.

8. The metallic flat gasket according to claim 1, wherein the depressions show a trapezoidal, triangular, rounded or rectangular cross section.

9. The metallic flat gasket according to claim 1, wherein the protrusions have a rectangular, triangular or trapezoidal cross section.

10. The metallic flat gasket according to claim 1, wherein the material thickness in the flange area (F) between a depression and a protrusion is reduced compared to the material thickness of the depression or protrusion, preferably by at least 8%.

11. The metallic flat gasket according to claim 1, wherein the surface-structured area surrounds the at least one through opening for fastening means by more than 50% of its perimeter.

12. The metallic flat gasket according to claim 1, wherein the surface-structured area extends along at least 80% of the length of the shorter edge of the outer edge of the gasket layer.

13. The metallic flat gasket according to claim 1, wherein the surface-structured area extends in the area between the through openings and the outer edge of the gasket along at least 50% of the outer perimeter of the gasket.

14. The metallic flat gasket according to claim 1, wherein the surface-structured area extends in an area outside the at least one sealing area and the optional at least one functional area and preferably covers this area by at least 70%.

15. The metallic flat gasket according to claim 1, wherein the structuring is present on both surfaces of the gasket layer.

16. The metallic flat gasket according to claim 1, wherein the height of the protrusions and/or the depth of the depressions alternates over the surface-structured area.

17. The metallic flat gasket according to claim 16, wherein the height of the protrusions and the depth of the depressions alternates in the surroundings of a through opening.

18. The metallic flat gasket according to claim 16, wherein the height of the protrusions and the depth of the depressions alternates in an area of the outer edge of the gasket layer and especially in an area of the shorter edge of the gasket layer.

19. The metallic flat gasket according to claim 1, wherein the surface-structuring is formed in the same gasket layer as the sealing area.

20. The metallic flat gasket according to claim 1, comprising at least two gasket layers, the at least one sealing area being formed in a different layer than the surface-structured area.

21. The metallic flat gasket according to claim 1, wherein the surface-structured area adjoins the sealing area at a distance of 0.3 to 3 mm.

22. The metallic flat gasket according to claim 1, wherein the ratio between a period (P) of the structuring and its height (H) is at the most 4.

23. The metallic flat gasket according to claim 1, comprising a deflector guiding an air stream to a hollow space defined by the surface structured area.

* * * * *

UNITED STATES PATENT AND TRADEMARK OFFICE
CERTIFICATE OF CORRECTION

PATENT NO. : 8,336,889 B2
APPLICATION NO. : 12/450974
DATED : December 25, 2012
INVENTOR(S) : Guenther Unseld et al.

It is certified that error appears in the above-identified patent and that said Letters Patent is hereby corrected as shown below:

Column 12, line 63, replace "30 to 150" with --30° to 150°--.

Signed and Sealed this
Fifth Day of March, 2013

Teresa Stanek Rea
*Acting Director of the United States Patent and Trademark Office*